United States Patent Office 3,642,905
Patented Feb. 15, 1972

---

3,642,905
PREPARATION OF CYCLOHEXANE-1,4-DIONES
Donald M. Fenton, 2861 Alden Place,
Anaheim, Calif. 92806
No Drawing. Filed Mar. 27, 1968, Ser. No. 716,338
Int. Cl. C07c 49/76
U.S. Cl. 260—590
5 Claims

ABSTRACT OF THE DISCLOSURE

The invention relates to the preparation of aromatic-substituted cyclohexane-1,4-diones by oxidative dimerization of acetone derivatives in the presence of a mercuric salt. The products are useful as intermediates in the preparation of substituted quinones and hydroquinones which find utility in manufacture of dyes, as photographic developers, medicines, antioxidants or inhibitors in coating compounds for rubber, stone, textiles, etc. and in paints, varnishes, motor fuels and oils, fats and oils and as polymerization inhibitors.

---

According to the present invention, it has been found that acetone derivatives can be oxidatively dimerized in the presence of a mercuric salt to form substituted cyclohexane-1,4-diones, as illustrated by the following equation in which the mercuric salt is the acetate:

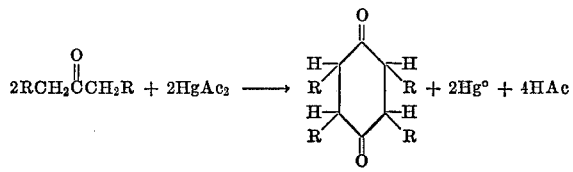

where R is an aryl or alkaryl radical having from about 1 to 20 carbon atoms.

The cyclohexanediones are readily oxidized, by conventional means, to the corresponding quinone as illustrated by the following equation:

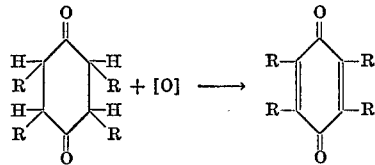

As indicated above, the acetone derivatives have the formula:

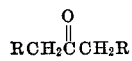

where the R's are the same or different aryl or alkaryl radicals having from about 6 to 20 carbon atoms. R may, for example, be phenyl, methyl phenyl, ethyl phenyl, butyl phenyl, hexyl phenyl, nonyl phenyl, naphthyl, methyl naphthyl, ethyl naphthyl, pentyl naphthyl, octyl naphthyl, etc.

The mercuric salts that can be employed are those that are soluble in the reaction medium. Included are the soluble inorganic mercuric salts and mercuric carboxylates of the lower molecular weight carboxylic acids. Examples are mercuric nitrate, mercuric acetate, mercuric propionate, mercuric butyrate, mercuric pentanoate, etc. Of these, mercuric carboxylates having from 1 to about 12 carbons are preferred, with mercuric acetate generally being most economical and efficient.

Any organic solvent that is liquid at reaction conditions and is inert to the reactants can be employed as the reaction solvent. Examples are ethers such as diethyl ether, diethylene glycol diethyl ether, triethylene glycol diethyl ether, tetraethylene glycol dimethyl ether, etc.

Various esters can also be employed as the solvent, e.g., methyl acetate, ethyl acetate, n-propyl formate, ethyl propionate, sec-butyl acetate, isobutyl acetate, ethyl n-butylate, n-butyl acetate, isoamyl acetate, n-amyl acetate, isoamyl n-butyrate, diethyl oxalate, glycol diacetate, isoamyl isovalerate, methyl benzoate, n-dibutyl oxalate, etc.

The saturated hydrocarbons can also be used as suitable inert solvents, e.g., pentane, hexane, heptane, octane, decane, dodecane, etc.

The reaction can be performed under relatively mild conditions including temperatures from about 50° to about 250° C. and pressures sufficient to maintain liquid phase conditions, preferably from about atmospheric to 100 atmospheres. Reaction time should be adequate to complete the oxidation as observed by the reactants achieving a steady state or autogenic pressure or by complete reduction of the mercuric ion to mercury.

The crude reaction product can be readily decanted to separate the organic compound products from the mercury and the former are treated to recover the product of the reaction in any conventional manner. Generally, crystallization is employed to recover the desired product. If desired, however, solvent extraction can also be employed to recover the product.

The mercury separated from the crude reaction product can thereafter be subjected to known oxidizing conditions to return it to a soluble salt suitable for recycling to the reaction. When the salt comprises a mercuric carboxylate, such as mercuric acetate, the mercury can be admixed with the carboxylic acid, i.e., acetic acid, and oxidized with known oxidizing agents to prepare the mercuric carboxylate for return to the reaction zone. Oxidizing agents such as nitric acid, chromic acid, permanganates, ozone, etc., can be employed with or without oxygen at temperatures from about 0° to about 250° C. to reoxidize the mercury to a mercuric salt suitable for recycling.

Conversion of the cyclohexanediones to the corresponding quinones is readily accomplished by conventional oxidation procedures. These procedures generally employ temperatures of about 20° to 100° C., with ambient temperature and pressure usually being satisfactory. Oxygen may be used for this purpose.

Conversion of the quinones to the corresponding hydroquinones is also readily accomplished by conventional reduction procedures.

The invention will be more specifically illustrated by the following example.

EXAMPLE

To 10 g. alpha,alpha'-diphenylacetone, 16 g. mercuric acetate and 75 ml. methyl benzoate in a 250 ml. flask was added heat with magnetic stirring. Around 50° C. the undissolved white solid began to turn yellow. At 125° C. some mercury began to precipitate. The mixture was further heated to 165° C. for one hour. The organic phase was distilled to give solvent and some unreacted ketone. The red solid in the flask was dissolved in benzene and chromatographed on alumina to give a light tan powder, M.P. 175–185° C.; mass spectrograph indicating a molecular weight of 416 with an impurity at 485. Found C=86.9; H=5.7. Calculated for tetraphenylcyclohexanedione is C=86.6; H=5.7; MW=416. This material was readily air oxidized to tetraphenylbenzoquinone.

I claim:
1. A process for the preparation of cyclohexane-1,4-dione derivatives comprising reacting a ketone of the formula

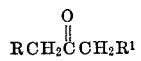

where R and R¹ are aryl or alkaryl radicals having from about 6 to 20 carbon atoms, with at least one mole of a soluble mercuric salt for each mole of ketone reactant in an inert organic solvent at a temperature of about 50° to 250° C. and a pressure sufficient to maintain liquid phase to effect oxidative dimerization and cyclization of the ketone and recovering tetraaryl or tetraalkaryl-cyclohexane-1,4-dione from said solvent.

2. The process of claim 1 in which R and $R^1$ are phenyl radicals and said derivative is tetraphenylcyclohexane-1,4-dione.

3. The process of claim 1 in which the mercuric salt is mercuric acetate.

4. The process of claim 1 in which methyl benzoate is employed as reaction solvent.

5. The process of claim 1 wherein the mercuric salt is a mercuric carboxylate having 1 to 12 carbons.

References Cited
UNITED STATES PATENTS 3,069,455   12/1962   Lum et al. _____ 260—590

DANIEL D. HORWITZ, Primary Examiner